(12) United States Patent
Delehanty et al.

(10) Patent No.: US 12,029,208 B2
(45) Date of Patent: Jul. 9, 2024

(54) DRIPPER BAG FOR ATTRACTING GAME AND FISH

(71) Applicant: DELCO, LLC, Broken Arrow, OK (US)

(72) Inventors: Patrick Brendan Delehanty, Broken Arrow, OK (US); Jeremy Wade Crocker, Brighton, CO (US)

(*) Notice: Subject to any disclaimer, the term of this patent is extended or adjusted under 35 U.S.C. 154(b) by 15 days.

(21) Appl. No.: 16/832,900

(22) Filed: Mar. 27, 2020

(65) Prior Publication Data

US 2020/0275644 A1 Sep. 3, 2020

Related U.S. Application Data

(63) Continuation-in-part of application No. 15/697,296, filed on Sep. 6, 2017, now abandoned.

(60) Provisional application No. 62/383,631, filed on Sep. 6, 2016.

(51) Int. Cl.
*A01K 97/04* (2006.01)
*A01M 31/00* (2006.01)

(52) U.S. Cl.
CPC ........... *A01K 97/04* (2013.01); *A01M 31/008* (2013.01)

(58) Field of Classification Search
CPC ....... A01K 97/04; A01M 31/008; B65D 1/08; B67D 1/0456; B67D 3/00; B67D 3/0048; B67D 7/0277
USPC ............. 211/59.1; 222/181.1, 187, 416, 422; 239/34, 37–40, 44, 542; 43/1, 44.99; 604/408
See application file for complete search history.

(56) References Cited

U.S. PATENT DOCUMENTS

| | | | | |
|---|---|---|---|---|
| 3,941,283 A | * | 3/1976 | Garbe | A01M 1/2033 222/187 |
| 4,000,738 A | * | 1/1977 | Howell | A61J 1/10 604/128 |
| 4,423,819 A | * | 1/1984 | Cummings | A61J 1/1475 215/232 |
| 4,567,987 A | * | 2/1986 | Lepisto | B65D 75/68 383/205 |
| 4,667,430 A | * | 5/1987 | Ziese, Jr. | A01M 31/008 119/711 |
| 4,722,449 A | * | 2/1988 | Dubach | B65D 47/36 215/235 |
| 4,898,280 A | * | 2/1990 | Runge | B29C 65/18 383/200 |
| 5,060,411 A | * | 10/1991 | Uhlman | A01M 31/008 43/1 |
| 5,220,741 A | * | 6/1993 | Burgeson | A01K 15/02 222/181.3 |
| 5,361,527 A | * | 11/1994 | Burgeson | A01K 15/02 43/1 |

(Continued)

*Primary Examiner* — Joshua E Rodden
(74) *Attorney, Agent, or Firm* — Martin S. High, P.C.

(57) ABSTRACT

Embodiments of the Dripper Bag for Attracting Game and Fish include a pouch, where the pouch forms a sombrero hang hole, a duel core tin tie removably affixed to the side of the pouch, a spout, a foil tamper seal, and a spout cap, and where on the bottom of the dripper bag is formed three selections of areas to puncture with varying flow rate and therefore varying total effluent time. Another embodiment of the Dripper Bag for Attracting Game and Fish includes a pouch, a top flow reducer, a bottom flow reducer wherein the top flow reducer is affixed to the pouch via a threaded aperture formed by the pouch.

4 Claims, 13 Drawing Sheets

(56) References Cited

U.S. PATENT DOCUMENTS

| | | | | |
|---|---|---|---|---|
| 5,497,906 A * | 3/1996 | Dubach | B65D 55/024 | 222/23 |
| 5,555,663 A * | 9/1996 | Burgeson | A01M 1/2077 | 239/53 |
| 6,219,963 B1 * | 4/2001 | Wang | A01G 27/006 | 239/38 |
| 6,241,717 B1 * | 6/2001 | Niedospial, Jr. | A61J 1/10 | 206/828 |
| 6,273,608 B1 * | 8/2001 | Ward, Jr. | B65D 33/30 | 383/203 |
| 9,016,505 B2 * | 4/2015 | Canegallo | B65D 75/5866 | 220/277 |
| 9,675,062 B1 * | 6/2017 | Kuhn | A01M 31/008 | |
| 2005/0189434 A1 * | 9/2005 | Burgeson | A01M 31/008 | 239/44 |
| 2007/0267363 A1 * | 11/2007 | Weck | G09F 3/20 | 211/59.1 |
| 2008/0279485 A1 * | 11/2008 | Steele | B31B 70/00 | 383/63 |
| 2009/0031608 A1 * | 2/2009 | Burgeson | A01M 31/008 | 43/1 |
| 2011/0151069 A1 * | 6/2011 | Harding | A61J 11/0095 | 426/117 |
| 2011/0233231 A1 * | 9/2011 | Barish | B65D 35/18 | 222/92 |
| 2011/0303760 A1 * | 12/2011 | Joshi | A61L 9/127 | 239/44 |
| 2015/0021356 A1 * | 1/2015 | Witchell | A45D 44/005 | 222/23 |
| 2015/0096218 A1 * | 4/2015 | Burr | A01M 31/008 | 43/1 |
| 2018/0064095 A1 * | 3/2018 | Delehanty | A01M 31/008 | |
| 2018/0249702 A1 * | 9/2018 | Burgeson | B65D 23/003 | |
| 2020/0275644 A1 * | 9/2020 | Delehanty | A01M 31/008 | |

* cited by examiner

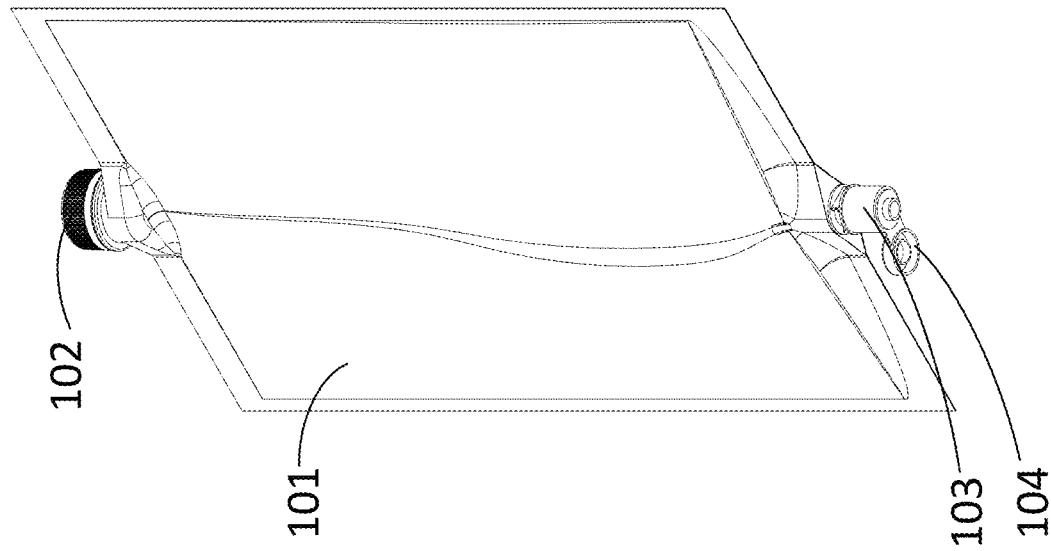
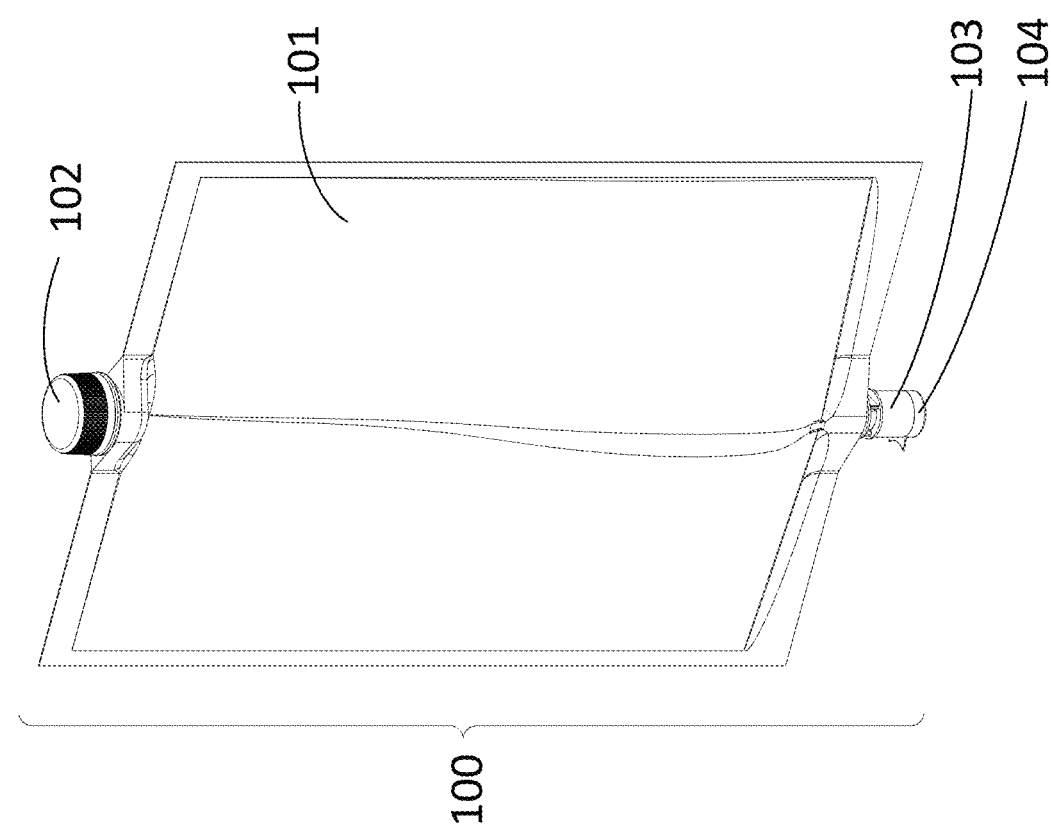

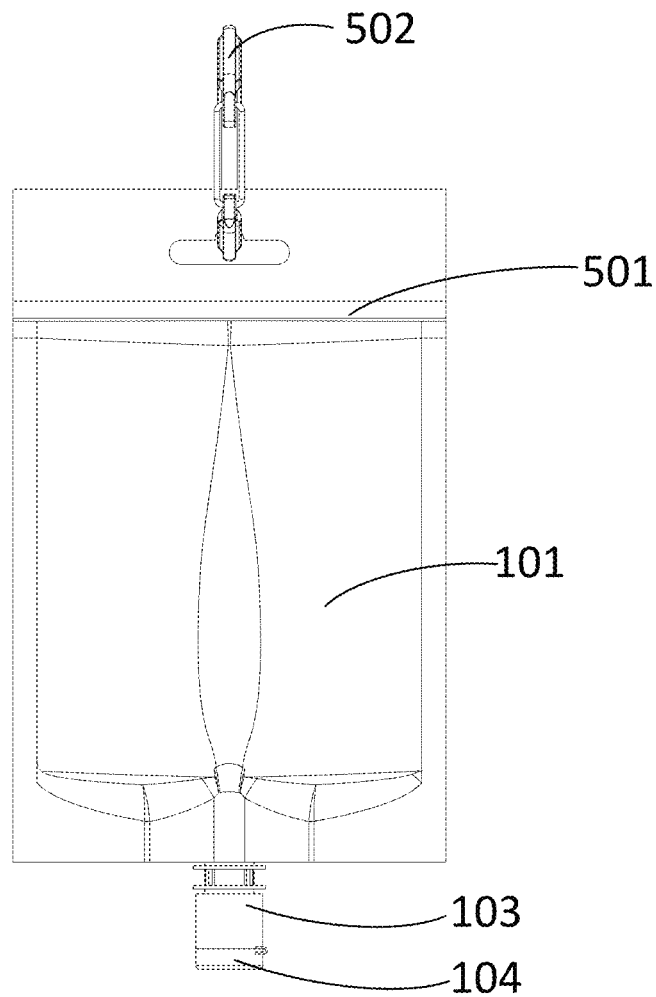
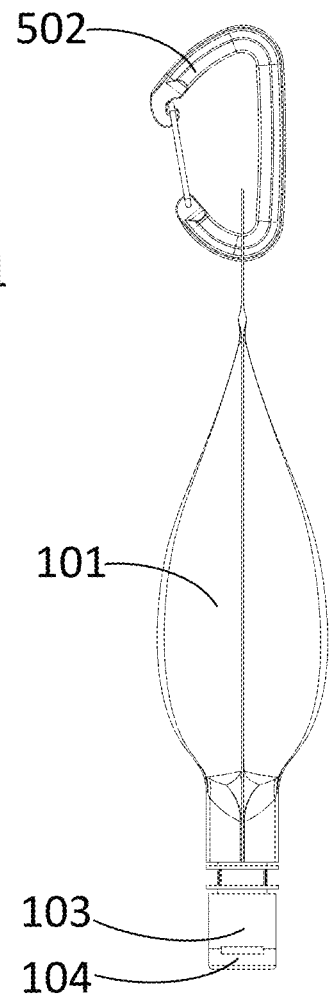
FIG 8A  FIG 8C
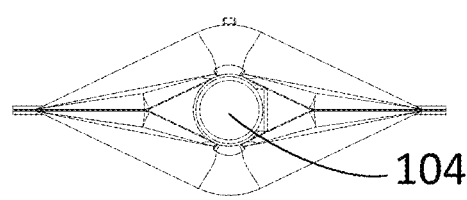
FIG 8B

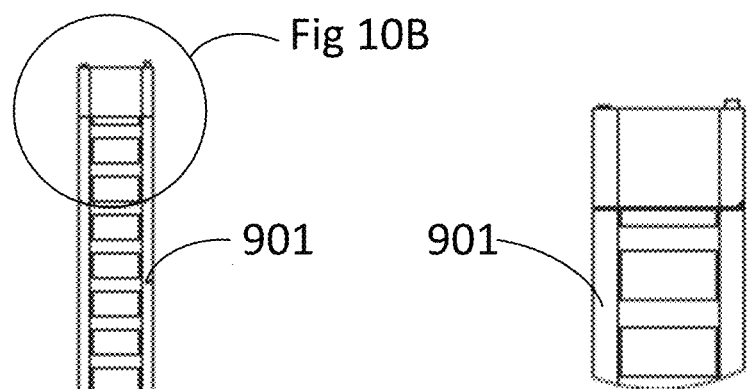
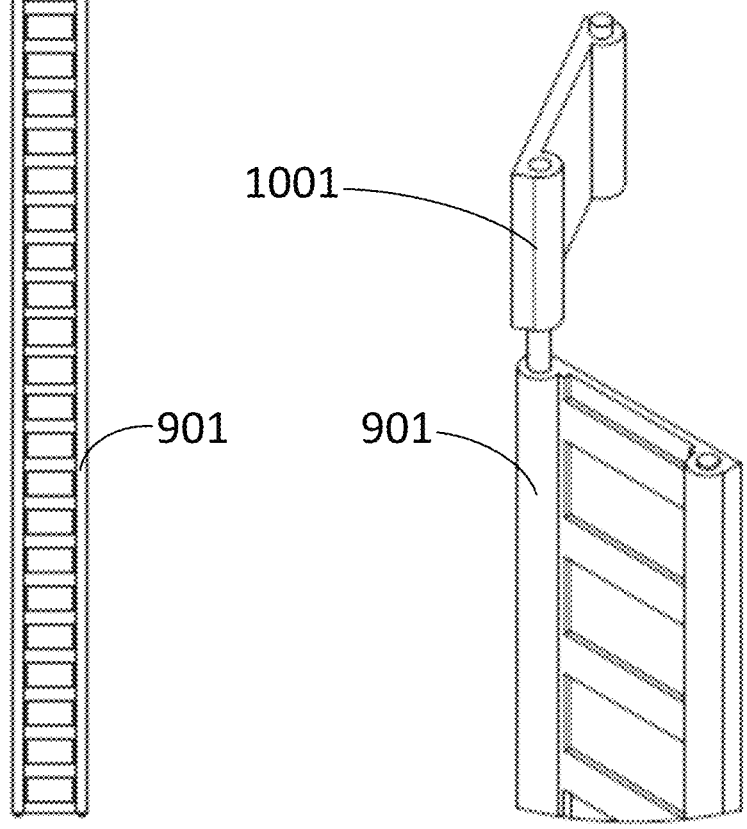
FIG 10A  FIG 10C

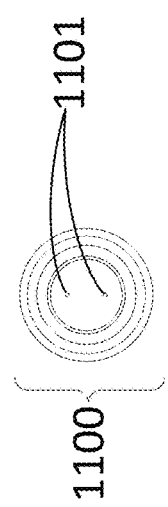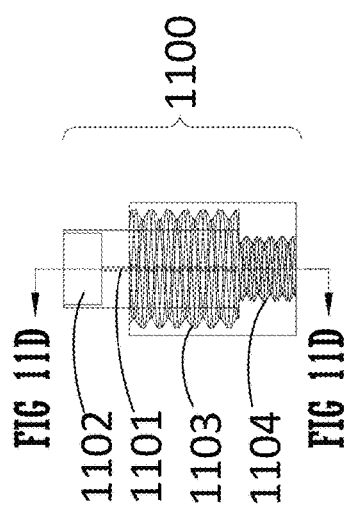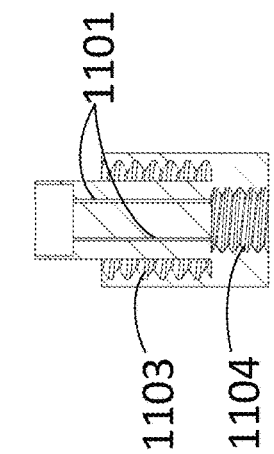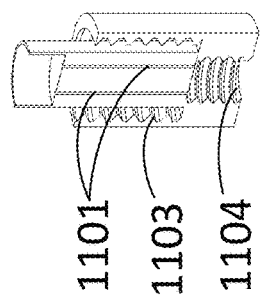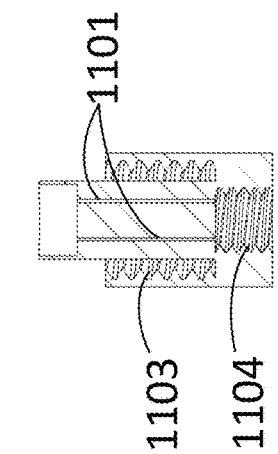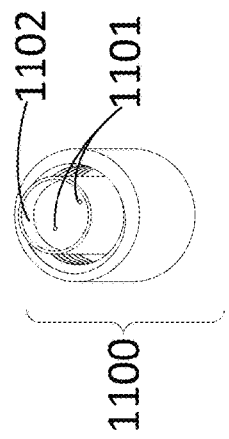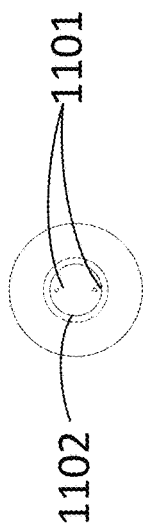
FIG 11A, FIG 11B, FIG 11C, FIG 11D, FIG 11E, FIG 11F

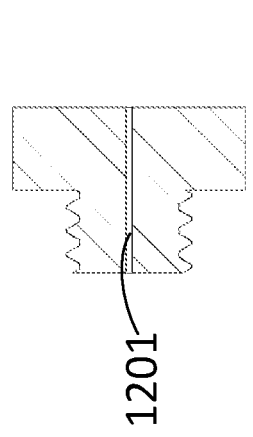
FIG 12C
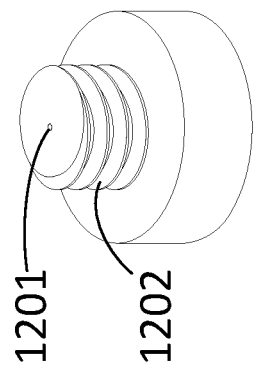
FIG 12D
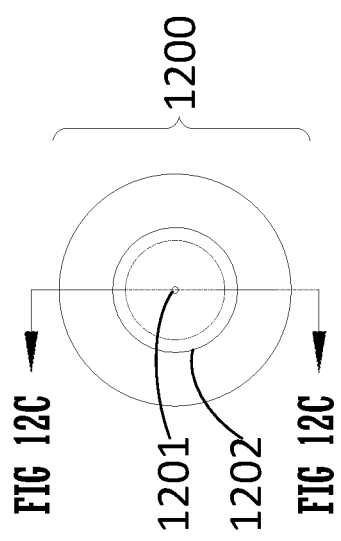
FIG 12A
FIG 12B

DRIPPER BAG FOR ATTRACTING GAME AND FISH

STATEMENT REGARDING FEDERALLY SPONSORED RESEARCH OR DEVELOPMENT

Not applicable

BACKGROUND OF THE EMBODIMENTS

Field of the Embodiments

The general field of the embodiments of the Dripper Bag for Attracting Game and Fish is game hunting and fishing accessories. More specifically, the field of the embodiments relates to dispersal of attractant fluids for attracting game animals and fish.

Description of Prior Art

Hunting game routinely requires the hunter to place scent in the field to attract game. The prior art consists of containers of scent placed in a location and opened to allow the scent to escape. A drawback of the prior art is that these devices are expensive and do not provide a long-duration of scent application.

SUMMARY OF THE EMBODIMENTS

Embodiments of the Dripper Bag for Attracting Game and Fish are comprised of a pouch, where the pouch forms a sombrero hang hole, a duel core tin tie removably affixed to the side of the pouch, a spout, a foil tamper seal, and a spout cap, and where on the bottom of the dripper bag is formed three selections of areas to puncture with varying flow rate and therefore varying total effluent time.

There has thus been outlined, rather broadly, the more important features of the embodiments of the Dripper Bag for Attracting Game and Fish in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be used as a basis for the designing of other structures, methods and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application which is measured by the claims, nor is it intended to be limiting as to the scope of the embodiments in any way.

BRIEF DESCRIPTION OF THE DRAWINGS

FIG. 1A is a perspective view of an embodiment of a large Dripper Bag for Attracting Game and Fish; FIG. 1B is a perspective view of an embodiment of a large Dripper Bag for Attracting Game and Fish.

FIG. 8A is a front view of an embodiment of a small Dripper Bag for Attracting Game and Fish; FIG. 8B is a bottom view of an embodiment of a small Dripper Bag for Attracting Game and Fish; FIG. 8C is a side view of an embodiment of a small Dripper Bag for Attracting Game and Fish.

FIG. 10A is a front view of an embodiment of the optional duel core tin tie; FIG. 10B is a front exploded view of an embodiment of the optional duel core tin tie; FIG. 10C is a perspective view of portion of an embodiment of the optional duel core tin tie.

FIG. 11A is a top view of an embodiment of the top flow reducer; FIG. 11B is a side view of an embodiment of the top flow reducer; FIG. 11B is a side view of an embodiment of the top flow reducer; FIG. 11C is a bottom view of an embodiment of the top flow reducer;

FIG. 11D is a side sectional view of an embodiment of the top flow reducer; FIG. 11E is a perspective sectional view of an embodiment of the top flow reducer; FIG. 11F is a perspective view of an embodiment of the top flow reducer.

FIG. 12A is a top view of an embodiment of the bottom flow reducer; FIG. 12B is a side view of an embodiment of the bottom flow reducer; FIG. 12C is a sectional view of an embodiment of the bottom flow reducer; FIG. 12D is a perspective view of an embodiment of the bottom flow reducer.

DETAILED DESCRIPTION OF THE PREFERRED EMBODIMENTS

Figure 2:
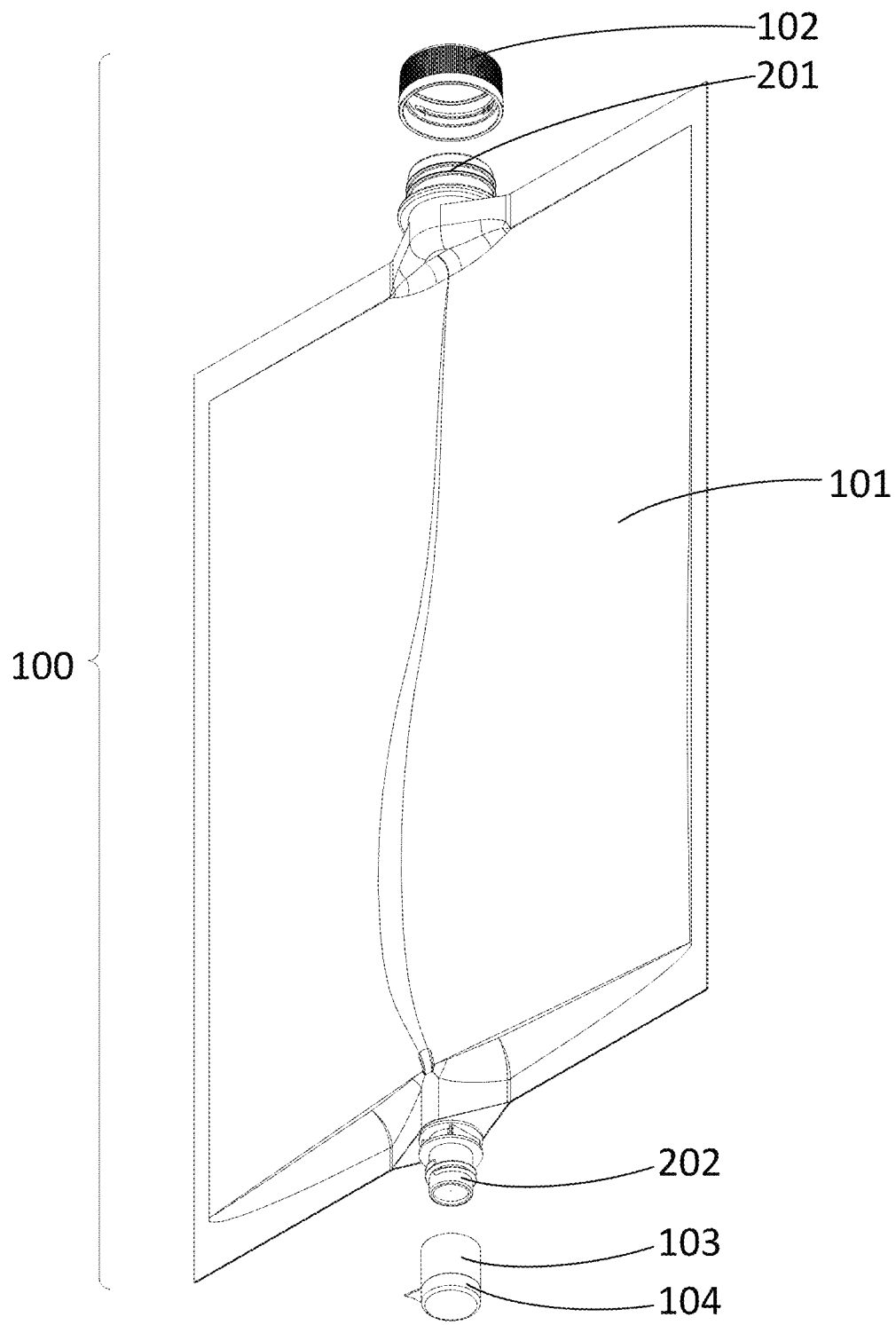
FIG. 2 is a perspective view of an embodiment of a large Dripper Bag for Attracting Game and Fish.
Figure 3A:
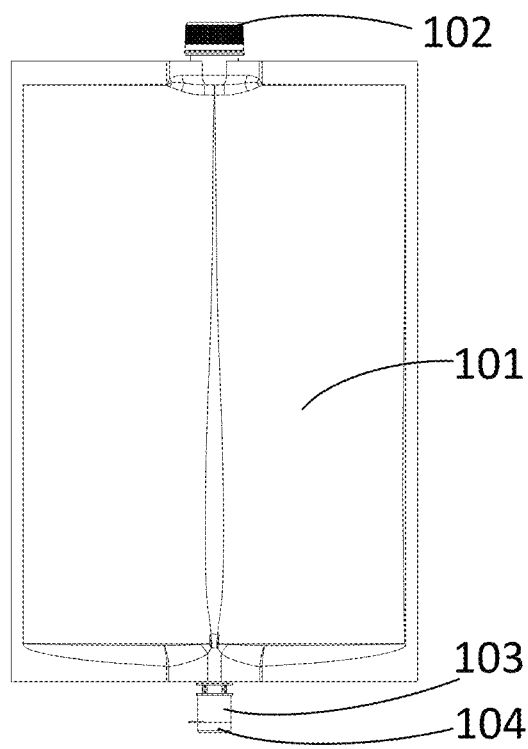
FIG. 3A is a front view of an embodiment of a large Dripper Bag for Attracting Game and Fish.
Figure 3C:
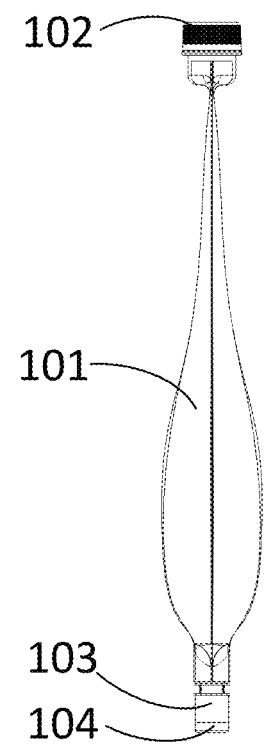
FIG. 3C is a side view of an embodiment of a large Dripper Bag for Attracting Game and Fish.
Figure 3B:
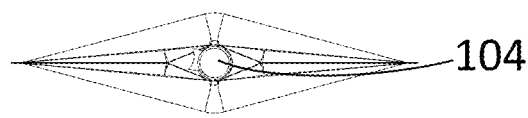
FIG. 3B is a bottom view of an embodiment of a large Dripper Bag for Attracting Game and Fish.
Figure 4A:
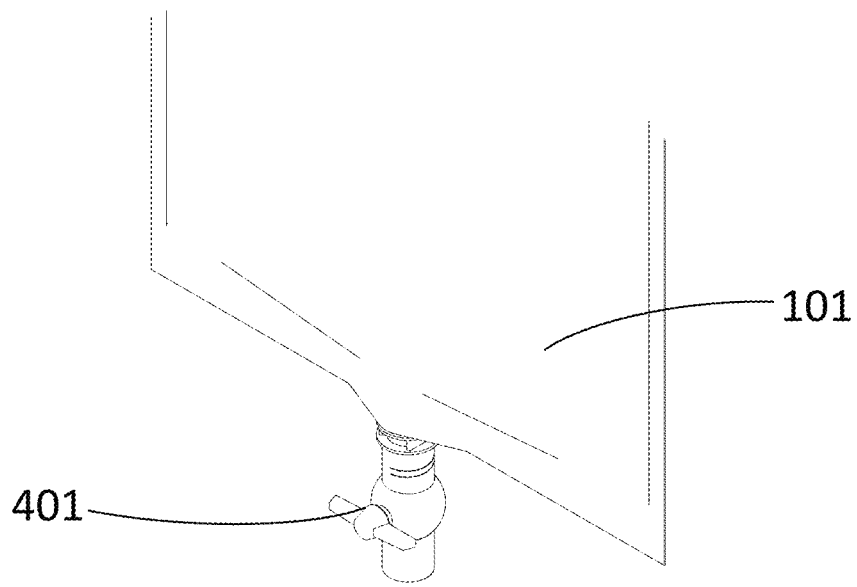
FIG. 4A is a front view of an embodiment of a large Dripper Bag for Attracting Game and Fish with a ball valve dispenser in the closed position.
Figure 4B:
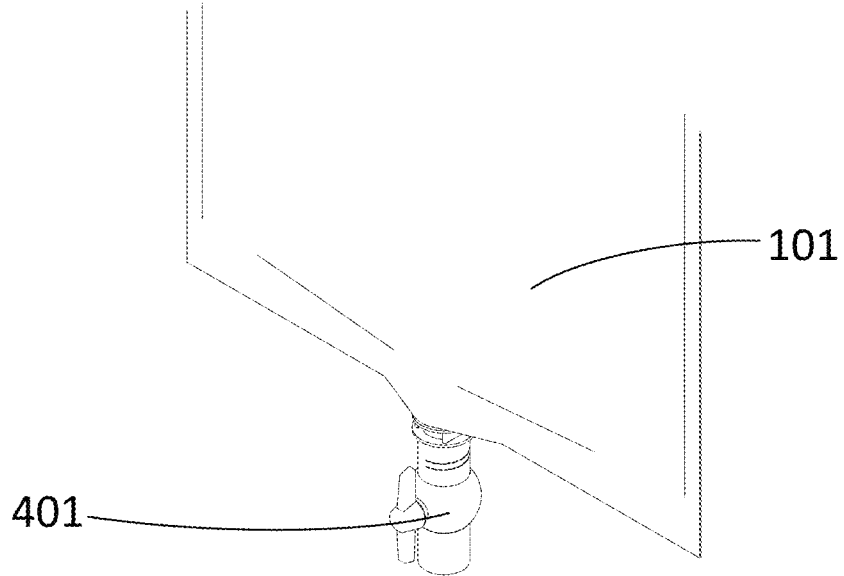
FIG. 4B is a front view of an embodiment of a large Dripper Bag for Attracting Game and Fish with a ball valve dispenser in the open position.
Figure 5:
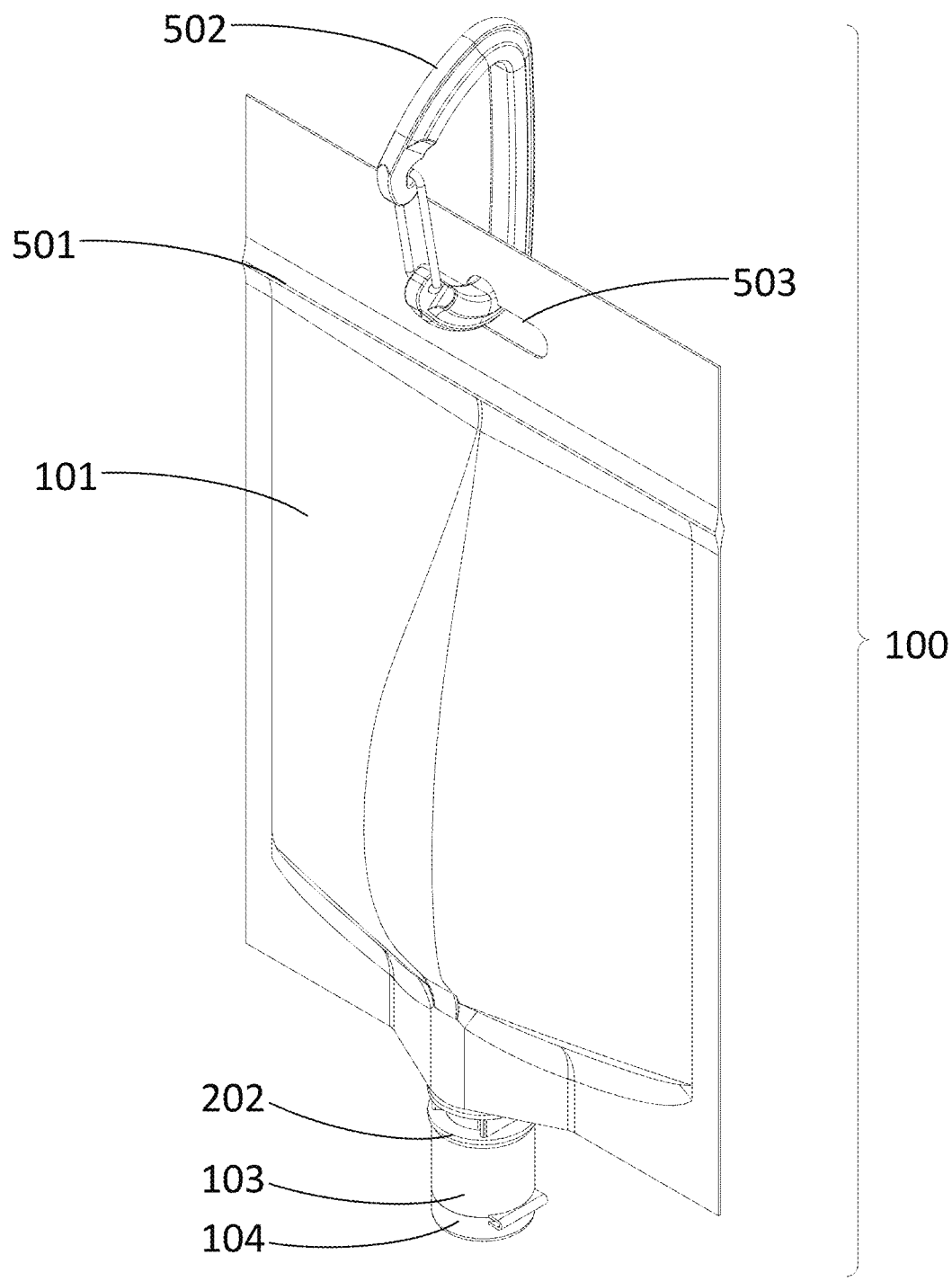
FIG. 5 is a perspective view of an embodiment of a small Dripper Bag for Attracting Game and Fish.
Figure 6:
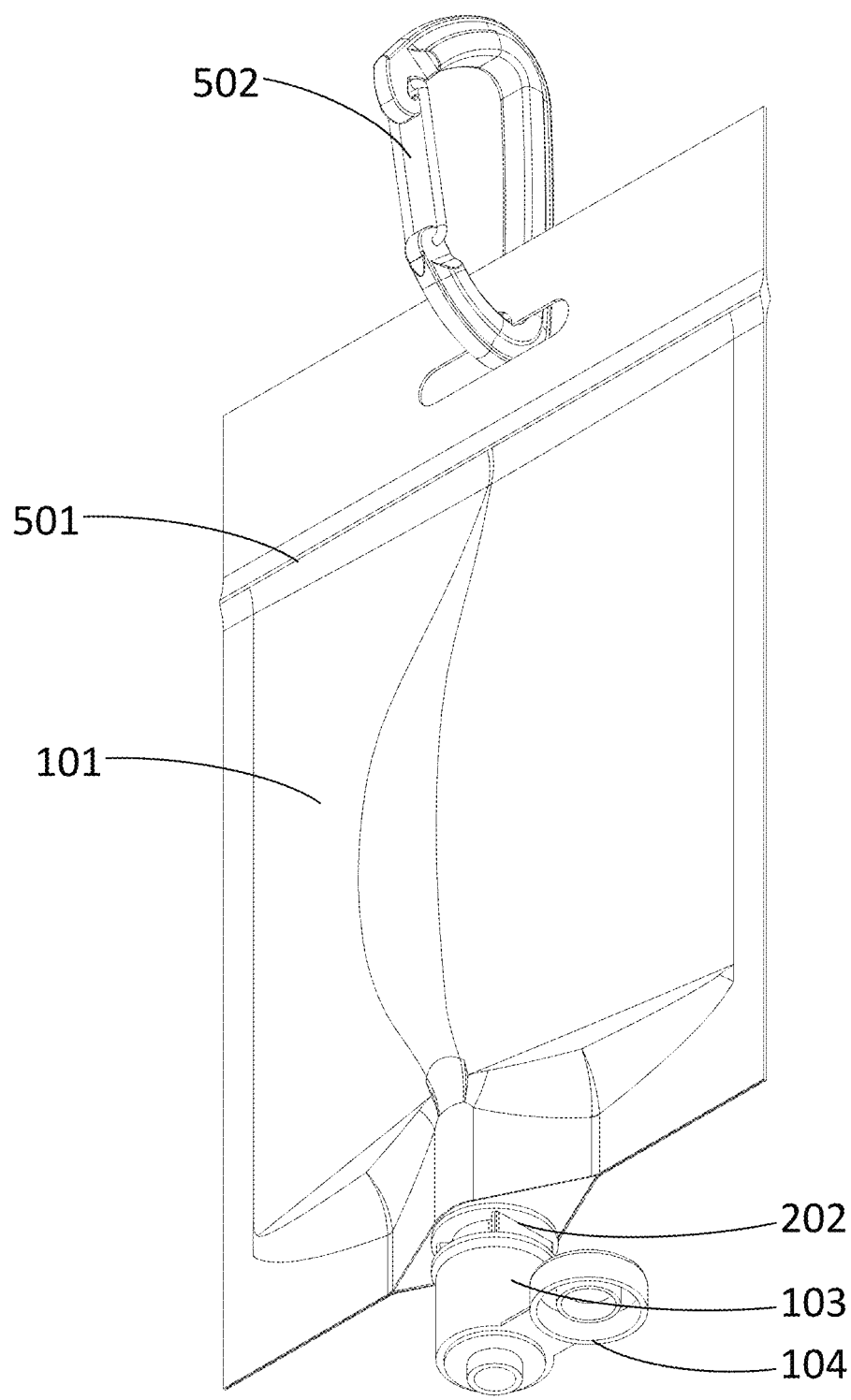
FIG. 6 is a perspective view of an embodiment of a small Dripper Bag for Attracting Game and Fish.
Figure 7:
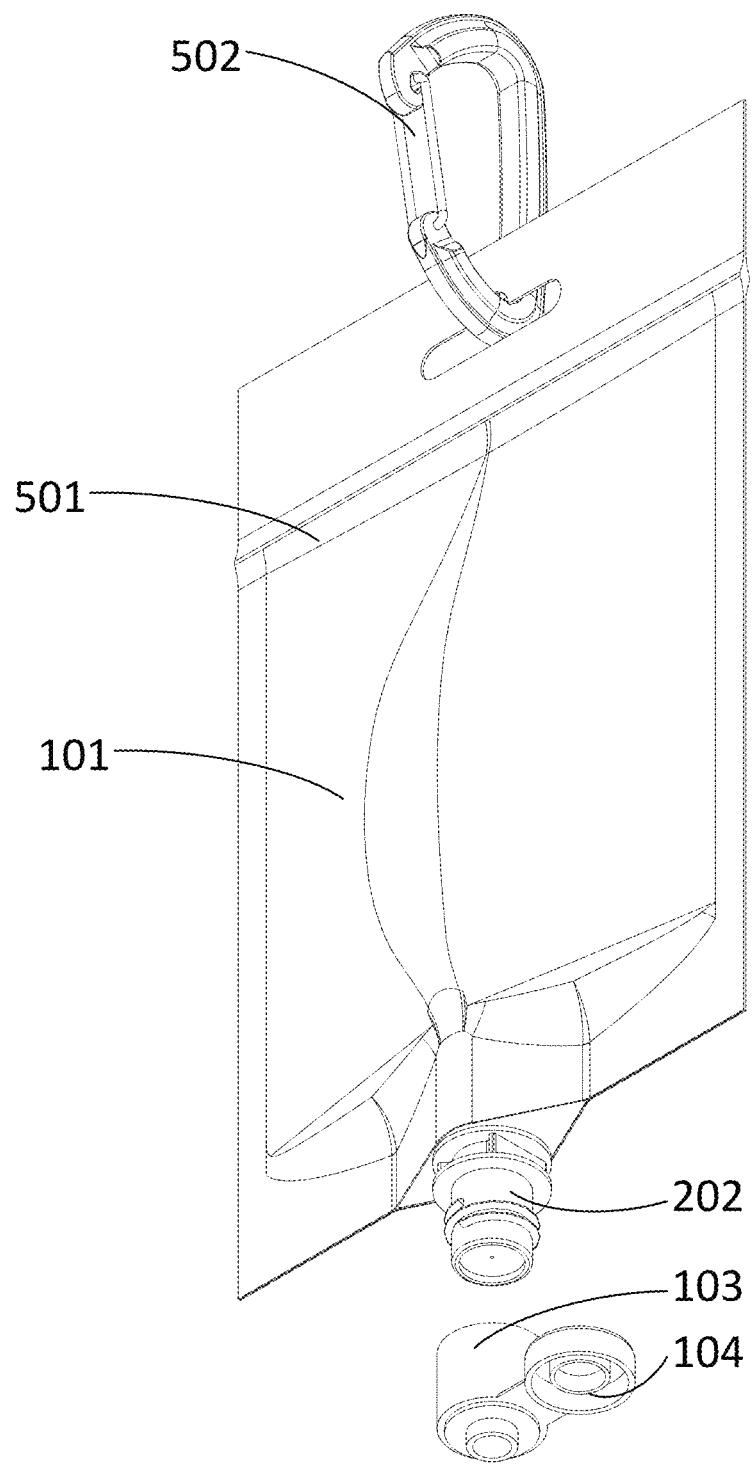
FIG. 7 is a perspective view of an embodiment of a small Dripper Bag for Attracting Game and Fish.
Figure 9:
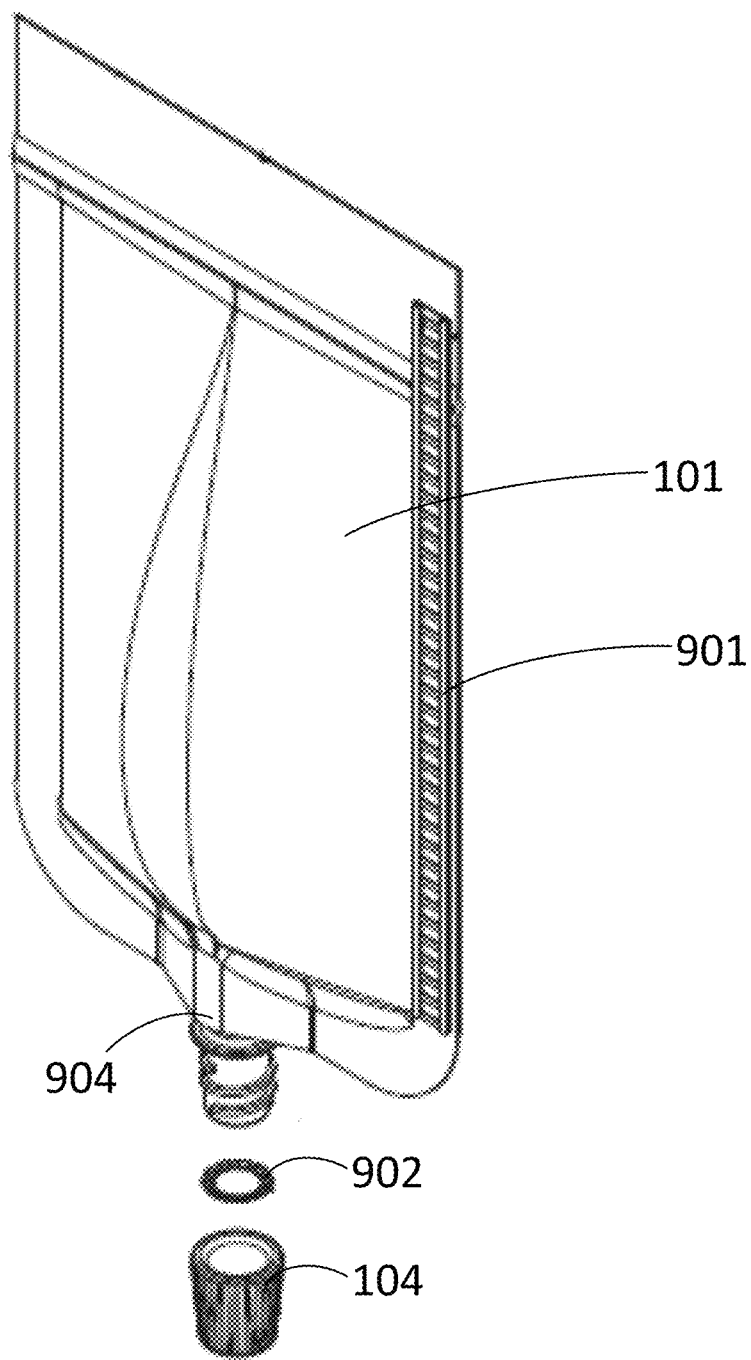
FIG. 9 is a front view of an embodiment of a small Dripper Bag for Attracting Game and Fish with the optional duel core tin tie removably affixed to the side of the pouch.
Figure 13B:
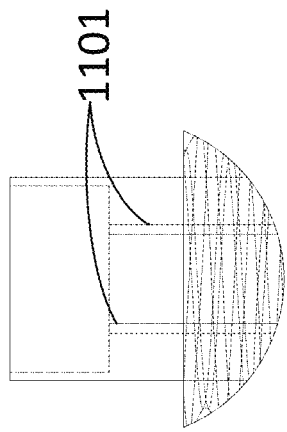
FIG. 13B is a enlarged view of a section of an embodiment of the top flow reducer.
Figure 13C:
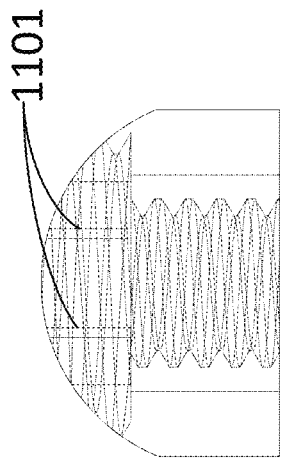
FIG. 13C is a enlarged view of a section of an embodiment of the top flow reducer.
Figure 13A:
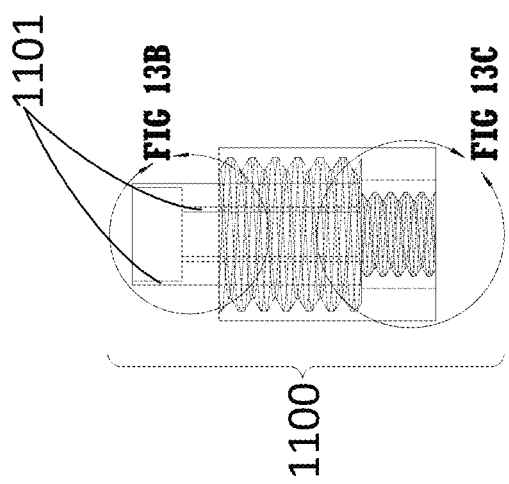
FIG. 13A is a side view of an embodiment of the top flow reducer.

Embodiments of the Dripper Bag for Attracting Game and Fish 100 comprise a pouch 101, a top cap 102, a spout 103, a spout cap 104, and a spout aperture 202.

One embodiment of the Dripper Bag 100 comprises a pouch 101, where the pouch forms a sombrero hang hole 503, a duel core tin tie 901 removably affixed to the side of the pouch 101. On the bottom of the dripper bag is formed three selections of areas to puncture with varying flow rate and therefore varying total effluent time. Another embodiment of the Dripper Bag 100 comprises an optional carabiner 502 that is threaded through the sombrero hang hole 503 and is used to attach the Dripper Bag 100 to a tree, fence, or other structure from which to hang the Dripper Bag 100.

Another embodiment of the Dripper Bag 100 comprises an optional zip aperture 501. The zip aperture 501 forms interlocking ridges near the edges of the opening to be easily closed or sealed by pressing one side of the opening against the other. The zip aperture 501 can be used to fill the pouch 101 with liquid attractant.

The pouch 101 is comprised of thin polymeric material or thin metallized polymeric material that is used to contain the liquid scent or liquid attractant desired to be distributed. The pouch is a fixed at its bottom to a spout. In one embodiment, the spout is comprised of a spout aperture 103 and a spout aperture cap 104. In another embodiment, the spout is comprised of a spout ball valve 401. The spout ball valve 401 can be used to adjust the rate of flow of the contents of the Dripper Bag for Attracting Game and Fish 100 per the requirements of the user.

In another embodiment of the Dripper Bag 100 the spout is 10 mm in diameter and the spout is covered with a foil tamper seal 902. The tamper seal 902 provides the means to drip the liquid scent from the pouch. The tamper seal 902 is covered with a spout cap 104 for shipment and transportation and to prevent inadvertent puncture of the foil tamper seal. A dual core tin tie 901 is a fixed to the side of the pouch 101 with an adhesive means that permits removal of the dual core tin tie 901. The pouch 101 also forms an opening in the form of a sombrero 503 at the top of the pouch to permit hanging of the pouch 101 from a tree or other vertical structure.

The dual core tin tie has added at its end a pre-serrated separation cut approximately 0.25 inches from its tip. This pre-serrated separation cut permits the user to grasp the plastic sheath 1001 end of the dual core tin tie 901 and remove the plastic sheath 1001 from the end. The dual core tin tie 901 can then be used to puncture the foil tamper seal 902 on the spout permitting flow of the liquid scent.

The spout 103 is comprised of a threaded connection that permits removal of the spout cap 104. On the end of the spout 103 is placed with adhesive means the foil tamper seal 902. The spout cap 104 is then threadedly affixed to the spout.

In another embodiment of the Dripper Bag 100 the spout 103 comprises a dripper nozzle and a cap. In this embodiment, the flow is regulated by the size of the dripper nozzle. Dripper nozzles of various size. In yet another embodiment of the of the Dripper Bag 100 a spout insert is placed between the pouch and the nozzle. The spout insert allows the user to regulate the flow of the liquid scent by replacing the spout insert with appropriate flow rated inserts.

In another embodiment of the Dripper Bag 100, the Dripper Bag is comprised a pouch 101, a top flow reducer 1100, a bottom flow reducer 1200. The top flow reducer 1100 is affixed to the pouch via a threaded aperture formed by the pouch 904.

The top flow reducer 1100 is comprised of a top cap 1102, one or more flow restriction capillaries 1101, a threaded midportion 1103, and a lower threaded portion 1104. The threaded midportion 1103 threads into the aperture form by the pouch 904. The top cap 1102 provides a holding volume with inside the pouch to allow the contents of the pouch to be released. The lower threaded allow the bottom flow restriction 1200 to be inserted via a threaded connection. The one or more flow restriction capillaries 1101 pass from the top of the top flow reducer 1101 to the opening at the bottom of the top flow reducer 1100 that forms the lower threaded portion 1104. The one or more flow restriction capillaries 1101 allow for the fluid in the pouch to be properly metered for release. Different flow rates can be accommodated by changing the number of flow restriction capillaries or though diameter of the one or more flow restriction capillaries.

The bottom flow reducer 1200 is comprised of a threaded portion 1202 and a single capillary 1201. The bottom flow reducer 1200 is threaddedly attached to the upper flow reducer 1100 via the lower threaded portion 1104 of the top flow reducer 1100.

The flow path for the fluid in the Dripper Bag 100 proceeds as follows. The fluid to be dispensed collects in the top cap 1102 and proceeds through the flow restriction capillaries 1101 and into the area formed by the lower threaded portion 1104. The floor then proceeds through the bottom flow reducer 1200 via the single capillary 1201. The combination of the what are more flow restriction capillaries 1101 in the single capillary 1201 allows for precise and reproducible metering of the fluid to the outside of the Dripper Bag 100.

What we claimed is:

1. A dripper bag for attracting game and fish comprising: a pouch with a spout aperture, a top flow reducer, a bottom flow reducer, a spout, and a spout cap; wherein the spout is comprised of a threaded connection that permits attachment and removal of the spout cap from the spout aperture; wherein the top flow reducer is configured to be affixed to the pouch via the spout aperture; wherein the top flow reducer is comprised of a top cap, one or more flow restriction capillaries, a threaded midportion, and a lower threaded portion; wherein the top cap is configured to form a holding volume inside the pouch.

2. A dripper bag for attracting game and fish comprising: a pouch with a spout aperture, a top flow reducer, a bottom flow reducer, a spout, and a spout cap; wherein the top flow reducer is configured to be affixed to the pouch via a threaded portion of the spout aperture, and wherein the spout is comprised of a threaded connection that permits attachment and removal of the spout to the spout aperture; wherein the top flow reducer is comprised of a top cap, one or more flow restriction capillaries, a threaded midportion, and a lower threaded portion; wherein the threaded midportion threads onto the spout aperture of the pouch; wherein the top cap is configured to form a holding volume inside the pouch.

3. The dripper bag for attracting game and fish described in claim 2, wherein the lower threaded portion allows the bottom flow reducer to be attached via a threaded connection; wherein the one or more flow restriction capillaries pass from the top flow reducer to an opening at a bottom of the top flow reducer that forms the lower threaded portion.

4. The dripper bag for attracting game and fish described in claim 3, wherein the bottom flow reducer is comprised of a threaded portion and a single capillary; wherein the bottom flow reducer is threadedly attached to the upper flow reducer via the lower threaded portion of the top flow reducer.

* * * * *